Nov. 18, 1969 H. HECKSCHER 3,478,661

MODULATED IMAGE PHOTOGRAPHY

Filed Oct. 5, 1966 4 Sheets-Sheet 1

Helmut Heckscher
Inventor
by Alfred H. Rosen
Attorney

Helmut Heckscher
Inventor
by Alfred H Rosen
Attorney

MODULATED IMAGE PHOTOGRAPHY

Filed Oct. 5, 1966 4 Sheets-Sheet 3

Helmut Heckscher
Inventor
by Alfred H. Rosen
Attorney

Helmut Heckscher
Inventor
by Alfred H. Rosen
Attorney

United States Patent Office 3,478,661

Patented Nov. 18, 1969

3,478,661
MODULATED IMAGE PHOTOGRAPHY

Helmut Heckscher, Belmont, Mass., assignor to Technical Operations, Incorporated, Burlington, Mass., a corporation of Delaware Filed Oct. 5, 1966, Ser. No. 584,577
Int. Cl. G03b *33/10*
U.S. Cl. 95—12.20 10 Claims

ABSTRACT OF THE DISCLOSURE

It is already known to modulate photostored images with spatial carrier frequencies in order to store several images on a single area of a photostorage medium, or in order to store color information on a black and white photostorage medium, in a manner which enables separate retrieval of one or more of the several images, or reproduction of a colored image in natural or arbitrary colors, respectively, by Fourier transform and spatial filtering techniques. Developments along these lines are described and claimed in the applications of Peter Mueller, Ser. No. 510,807 filed Dec. 1, 1965 and Ser. No. 564,340 filed July 11, 1966, both assigned to the same assignee as the present application. The present invention relates to camera systems for making such photostored images, employing a light modulating device located between the object being photographed and the camera, at a distance from the camera equal to or less than the hyperfocal distance but not less than one half the hyperfocal distance, for the particular focal length and aperture of the lens system. With the modulating device in such a location, the modulating device is multiplied with the image of the object in the photostored record and all of the properties of image storage and retrieval or reconstruction which are described and claimed in the above referenced applications of Mueller are available.

Figure 1:
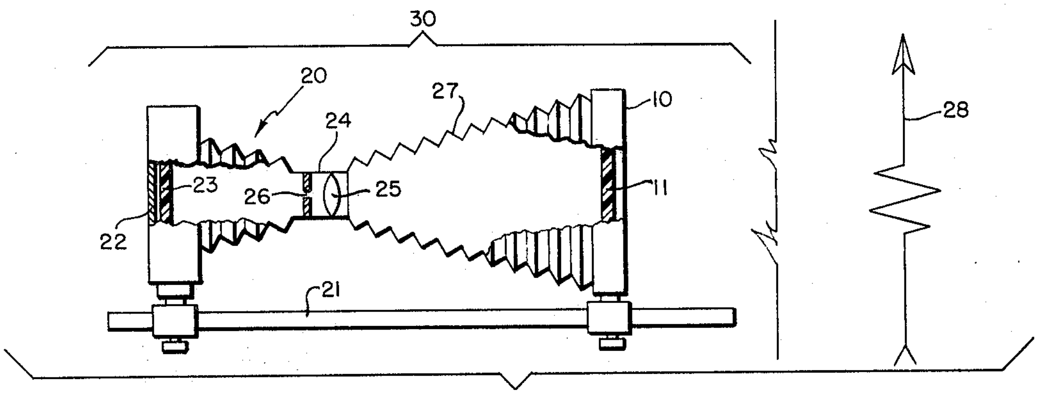

Location of the modulating device in the hyperfocal region as above specified makes it possible to use a modulating device of relatively coarse structure. Thus, for example, a series of superimposed modulating devices, each having a unique azimuthal orientation in a chosen plane transverse to the optic axis of the camera system can be built up in thin layers and will appear for pracitcal purposes to be in the same plane, as far as the camera is concerned.

According to a particular feature of the present invention, it is possible to employ as a modulating device a single structure having a plurality of gratings for imposing a periodic variation in intensity on incident light, each grating incorporating a different color filter and having such a unique orientation, in a new system in which several different objects are photographed in multiple overlapping exposures on the same piece of photostorage medium, each under light of a unique color corresponding respectively to one of the color filters. This has the practical effect of modulating the recorded image of each object with only one of the spatial carrier frequencies, namely that represented by the grating associated with the color of the light used in photographing the object, so that each image has associated with it a spatial carrier frequency which is characterized by its unique azimuthal orientation. The net result in this cast is to provide, in effect, an optically rotatable mechanically fixed spatial frequency modulating device in a system which makes a separately modulated record of each individual image. These images can thereafter be separately reconstructed from the photostored record by Fourier transform techniques with spatial filtering, as taught in the first of the above mentioned applications of Mueller.

BACKGROUND OF THE INVENTION

If a diffraction grating is positioned in the front focal plane of a lens and is illuminated by collimated light from a point source, the diffraction pattern in the back focal plane of the lens (called the Fourier transform plane) will appear as a series of dots extending in a line perpendicular to the lines of the grating about the optic axis. If an object, in the form of an image on a photographic transparency, for example, is placed with the grating in the front focal plane of the lens, a diffraction pattern of the grating convolved with the image spectrum appears in the transform plane. Thus, at each diffraction order of the grating an image spectrum is found. A second lens can be placed at its own focal length beyond the transform plane and it will retransform the diffraction pattern back to the transparency image (the object) and the grating. If this retransformation is displayed on a screen in the back focal plane of the second lens, it will appear as the image and the grating, one superposed on the other. An opaque mask positioned in the transform plane, and having transparent apertures passing two or more of the diffraction orders, the apertures being large enough to pass the image spectrum centered at each order, will not remove the grating from the retransformation. If the mask has only one aperture, passing only one diffraction order, (i.e.: only one object spectrum) it will display a retransformation image without the grating; this is so because the spacing of the diffraction orders is related to the grating periodicity, and when only one order is passed the period information (i.e.: the periodic modulation) is lost.

The mask placed in the transform plane is technically known as a "spatial filter." A spatial filter may be defined as a device placed in the Fourier transform plane of an optical system for modifying amplitude and/or phase of one or more selected spatial frequencies. In the foregoing example, this "modifying" is a blocking by absorption or reflection of all but one or more selected diffraction orders in the transform plane.

A photostored image on a photostorage medium, which has been modulated in density so that it appears, for example, like a television picture with its raster resolved, may be made by making the image exposure through a grating which imposes a periodic spatial variation in intensity on incident light. Such an image is said to be multiplied with the grating. If placed in the front focal of the first lens in the system described above it will (provided it is a transparency) produce a diffraction pattern of the grating convolved with the image spectrum. A plurality of different images, overlapping on the same transparency, each multiplied with a grating having a unique orientation in the plane of the photostorage medium will produce a plurality of spatially separated diffraction patterns each having unique direction in the Fourier transform plane, and each such pattern being convolved with a unique image spectrum. As is taught in the first of the above-mentioned applications of Mueller, the images can be separately retrieved by spatial filtering in the Fourier transform plane.

If such a photostored image is made by exposure to white light of a single object through a set of three gratings, so close together as to be substantially in the same plane, each with a unique azimuthal characteristic, and each incorporating a unique color filter, this image can also produce three spatially separated diffraction patterns in the Fourier transform plane of the above-described system. This time, however, each diffraction pattern will be convolved with an image spectrum of the same object. As is taught in the second of the above-mentioned application of Mueller, spatial and spectral filtering in the Fourier transform plane can be employed to reconstruct an image of the object in natural color, or in arbitrary colors.

According to the present invention the spatial carrier frequency modulating device, in the form of one or a plurality of gratings, for example, can be located between the hyperfocal distance and half the hyperfocal distance in front of the camera lens for either of these systems. When so used in conjunction with a still or movie camera, it enables the taking of still or moving pictures in full color on black-and-white film, by the simple expedient of attaching a supporting structure and the appropriate multiple modulating and color filter device to the front of the camera.

The hyperfocal distance (a concept encountered in photography) has this property: If a lens is focused at the hyperfocal distance then everything from one half this distance to infinity will be within the depth of field, i.e., will be "reasonably" sharp (Cox: "Optics—The Technique of Definition," The Focal Press, 1961, page 66). To express this sharpness quantitatively the concept of the circle of confusion is usually used. This is the diameter of the image of a point in the plane of the film. Once the maximum permissible circle of confusion C has been decided upon, the hyperfocal distance is given by $$H=\frac{f\times d}{C}$$

where $f$ is the focal length of the lens and $d$ is the diameter of its entrance pupil. Since the F number of a lens is equal to $f/d$ we can write $$H=\frac{f^2}{CF\#}$$

In the present invention it is convenient to have the hyperfocal distance as small as possible. This can evidently be done by choosing $f$ as small as possible and C and the F# as large as possible.

An example may be instructive. In this invention the largest permissible circle of confusion is determined by the line frequency of the grating in the plane of the film in the camera. If it is assumed that a line frequency of 18 lines/mm. is desired, a circle of confusion with a diameter of 1/40 mm. would allow the raster image to be resolved. Further, if a 10 mm. focal length lens is chosen, such as may be used for 8 or 16 mm. movie cameras, the following relationship is obtained:

$$H=\frac{4000\text{ mm.}}{F\#}$$

If the lens be stopped down to F#16:

$$H=25\text{ cm. (about 10 inches)}$$

If the camera lens be focused at this distance, everything from 5" to infinity will be "sharp" as defined by the circle of confusion. Therefore, one can put a modulating device having a line frequency of 18 lines/mm. about 5" from the lens and both it and distant objects will be satisfactorily imaged (i.e.: resolved). The sharpness of the carrier modulation in the film plane would be improved if the modulating device were placed at the hyperfocal distance, (i.e., 10 inches from the lens in this example). For the purposes of the present invention, it may be placed somewhere between H and one-half H.

Figure 5:
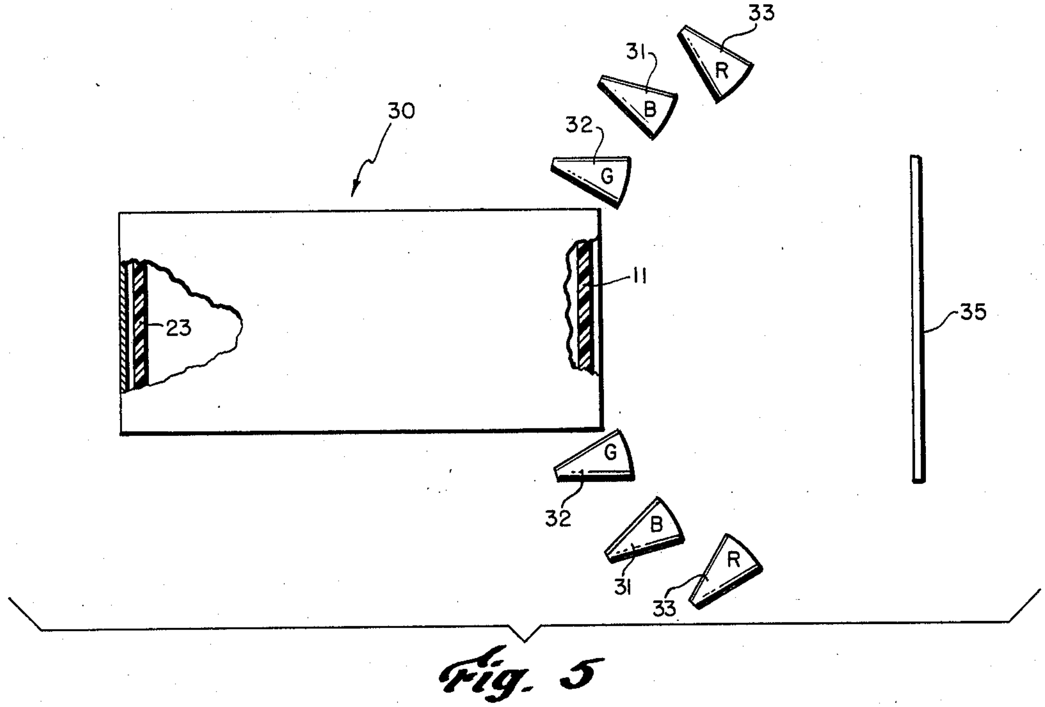
Figure 2A:
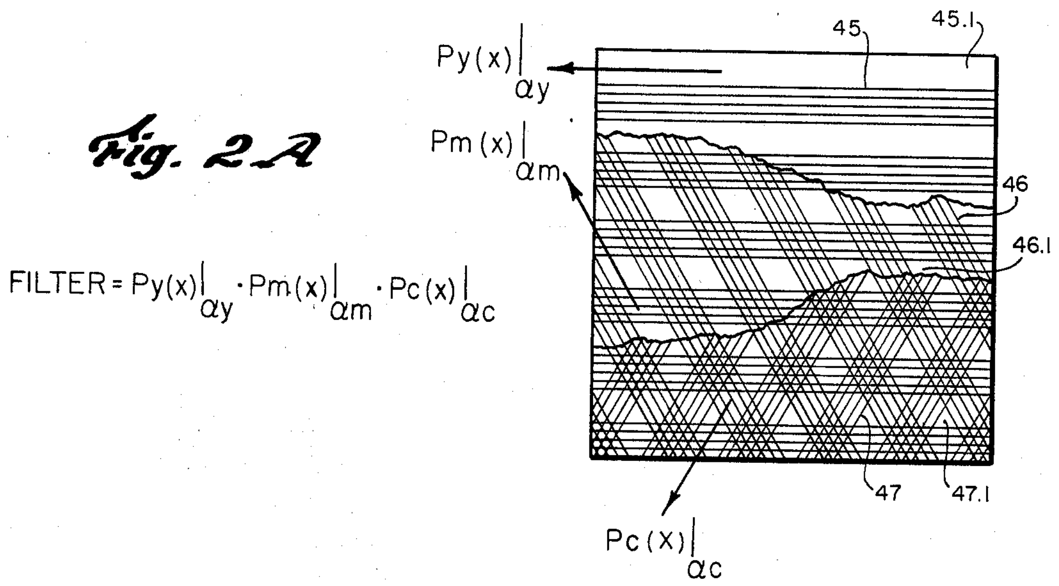
Figure 2B:
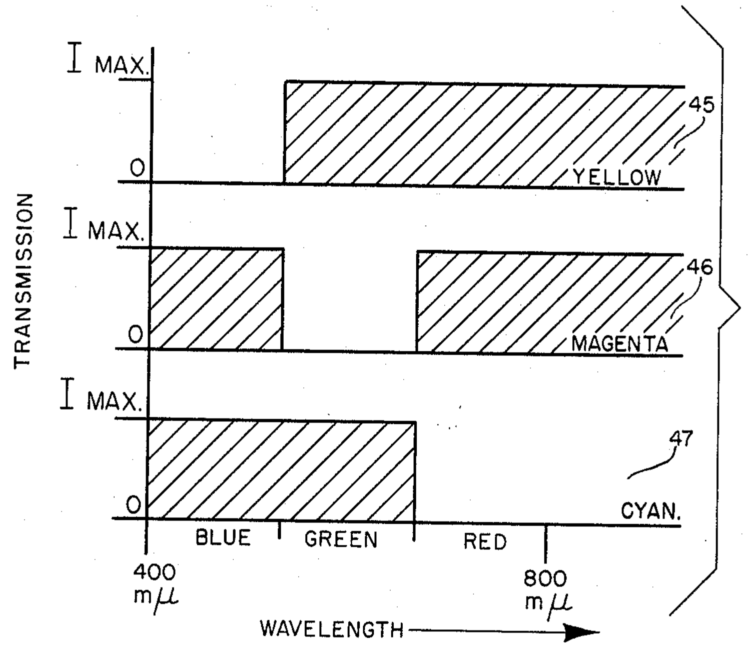
Figure 3:
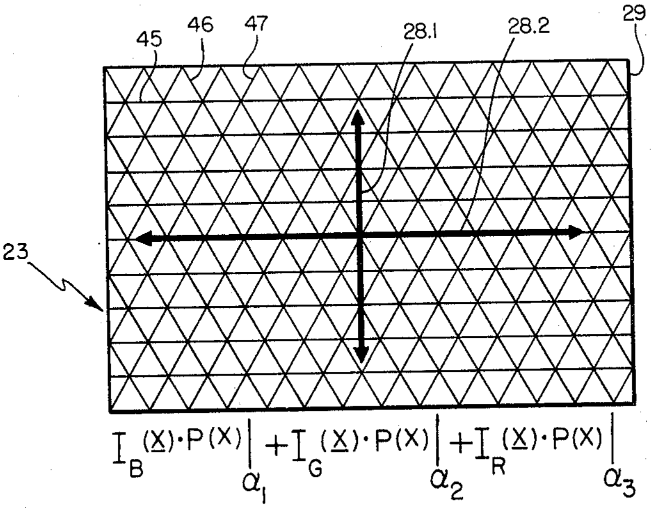
Figures 4A, 4B:
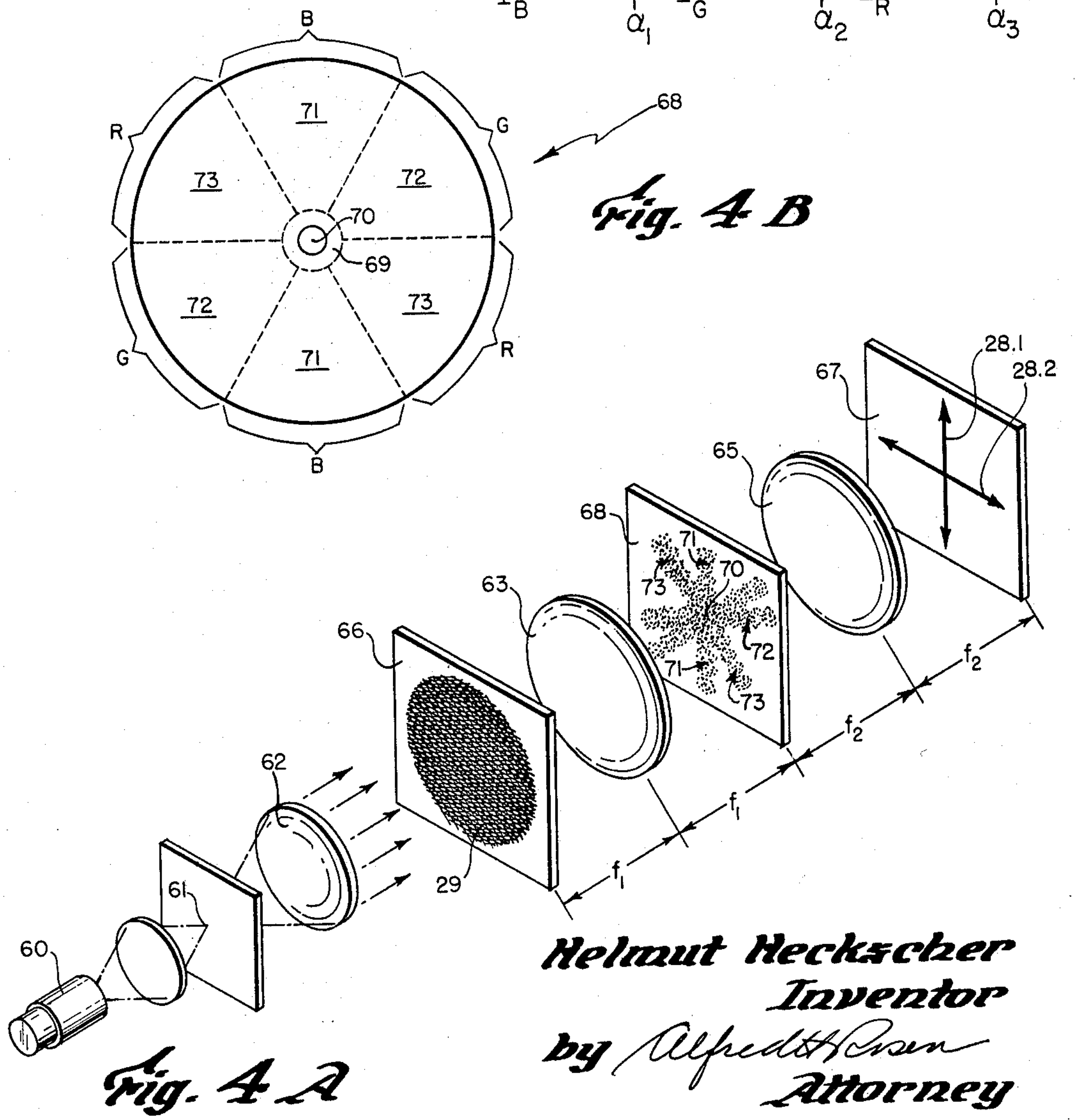
Figure 6A:
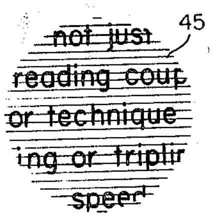
Figure 6B:
Figure 6C:
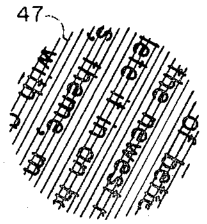
Figures 7, 8:
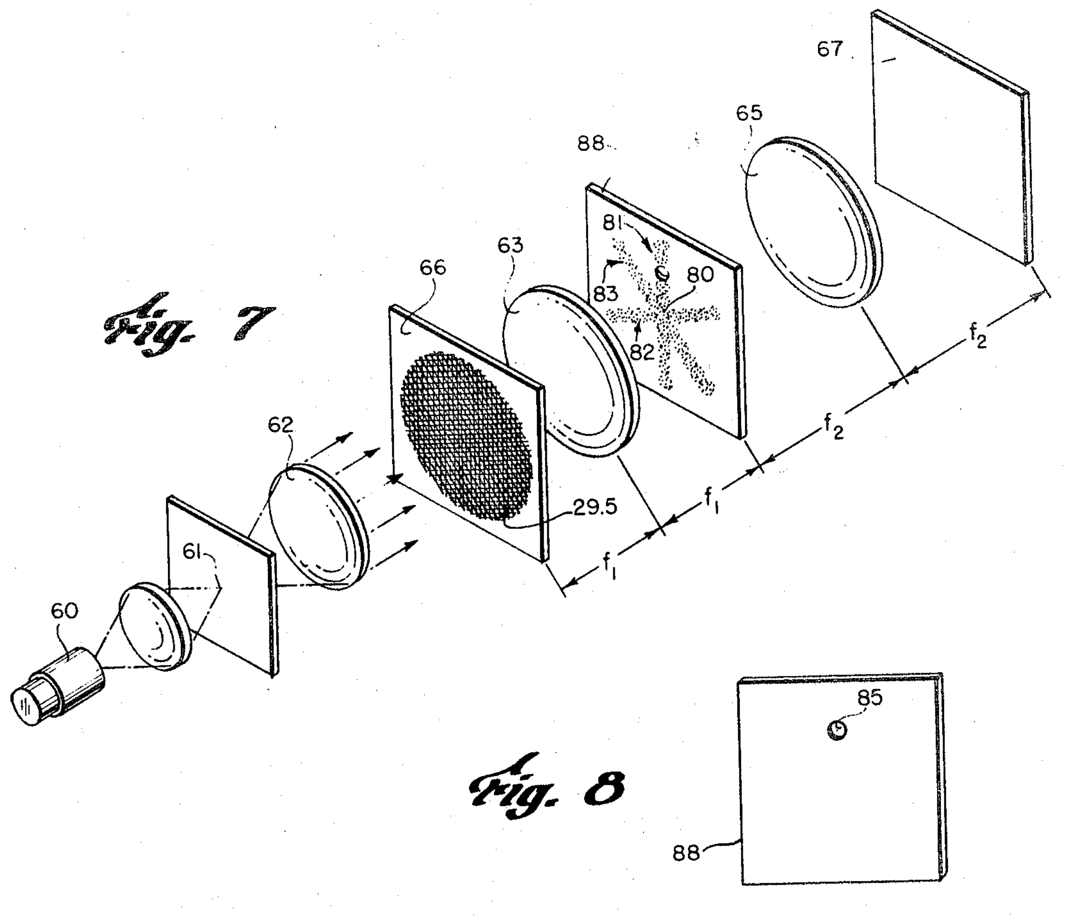

These and other objects and features will be apparent from the following description of a few embodiments of it. This description refers to the accompanying drawings, in which:

FIG. 1 schematically illustrates a camera fitted with a light modulating device according to the invention;

FIG. 2A illustrates the construction of a light modulating device;

FIG. 2B graphically illustrates the optical properties of the device of FIG. 2A;

FIG. 3 illustrates the nature of a stored image;

FIG. 4A schematically illustrates an optical system for reconstructing colored images from a plurality of images of the same scene;

FIG. 4B illustrates a spatial filter for color reconstruction;

FIG. 5 schematically illustrates an embodiment of the invention for recording several images of different scenes on a single area of a photostorage medium;

FIGS. 6A, 6B and 6C illustrate in a schematic way three images stored by the system of FIG. 5;

FIG. 7 schematically illustrates an optical system for separately reconstructing the images stored by the system of FIG. 5; and FIG. 8 illustrates a spatial filter useful in the reconstruction syetem of FIG. 7.

For the purposes of the present disclosure, the basic equation for a color scene may be described as:

$$I_{w}(\underline{x},\lambda)=I_{\bar{\lambda}_1}(\underline{x})+I_{\bar{\lambda}_2}(\underline{x})+\ldots I_{\bar{\lambda}_n}(\underline{x}) \quad \text{(Relation 1)}$$

Where:

$I_w(x,\lambda)$ represents the intensity distribution of light over the scene as a function of spatial coordinates $(x)$ and wavelength $\lambda$); and $I\bar{\lambda}_i(x)$ represents the intensity distribution in the wavelength band $\bar{\lambda}_i$ as a function of spatial coordinates $(x)$; and $\bar{\lambda}_i$ is the average wavelength in the band from $\bar{\lambda}_i\Delta\lambda_i$ to $\bar{\lambda}_i+\bar{\lambda}_i$ This basic equation describes the energy distribution in the image plane of a camera. When the color components are blue, green and red, the energy distribution is the sum of three components at each point in the scene.

In the final storage of color-coded information in a color-blind (e.g.: black-and-white) recording from which the original color scene can be reconstructed, one would like the storage to be according to the following equation:

$$I_{w}(\underline{x},\lambda)\cdot\pi(\underline{x},\lambda)=I_{\bar{\lambda}_1}(\underline{x})\cdot P(\underline{x})|\alpha_1+I_{\bar{\lambda}_2}(\underline{x})\cdot P(\underline{x})|\alpha_2+\ldots I_{\bar{\lambda}_n}(\underline{x})\cdot P(\underline{x})|\alpha_n \quad \text{(Relation 2)}$$

Where:

$I_w(\underline{x},\lambda)\cdot\pi(x,\lambda)$ represents the intensity distribution $I_w(\underline{x},\lambda)$ multiplied by the total periodic modulation ($\pi$) of the periodic modulations on all wavelength bands as a function of spatial coordinates $(\underline{x})$ in the scene and wavelength ($\lambda$); and $I\bar{\lambda}_i(\underline{x})\cdot P(\underline{x})/\alpha_i/$ represents the intensity distribution in the wavelength band $\bar{\lambda}_i$ as a function of spatial coordinates $(\underline{x})$ multiplied by the periodic modulation (P) of the light in that band as a function of spatial coordinates $(\underline{x})$ with the azimuthal characteristic $\alpha_i$.

It will be understood that the wavelength bands can be blue, green and red, and the periodic modulations can be given azimuthal charcteristic oriented at angles $$\alpha,\ \alpha+\frac{\pi}{3}\text{ and }\alpha+\frac{\pi}{3}$$

respectively, as one fairly obvious example, in which case Relation 2 would take the form:

$$I_{W}(\underline{x},\lambda)\cdot\pi(\underline{x},\lambda)=I_{B}(\underline{x})\cdot P(\underline{x})|\alpha+I_{G}(\underline{x})\cdot P(\underline{x})|\alpha+\frac{\pi}{3}+I_{R}(\underline{x})\cdot P(\underline{x})|\alpha+\frac{2\pi}{3} \quad \text{(Relation 2A)}$$

FIG. 2A illustrates a "negative" color filter consisting of the superposition of three colored Ronchi rulings having respective unique azimuthal characteristics, e.g.: rotated in $\pi/3$ increments from one another. FIG. 2B shows ideally the required spectral transmissions of the respective rulings. Horizontal bars 45 in FIG. 2A represent yellow bars, with transparent bars intervening; these comprise a yellow Ronchi ruling having periodicity P $(\underline{x})$, which generally is represented mathematically by $$P_{y}(\underline{x})|\alpha_{y}$$

Similarly, a magenta ruling 46 is generally represented by $$P_{m}(\underline{x})|\alpha_{m}$$

and a cyan ruling 47 is generally represented by $$P_c(\underline{x})|\alpha_c$$

In each of these rulings the respective transmission spectra in FIG. 2B refer to the absorbing portion of the ruling (the portion that would be opaque in a ruling consisting of opaque bars or lines separated by transparent bars or lines), while the intervening portions are preferably transparent passing all visible wavelengths substantially unattenuated.

The three rulings are superposed, so that they are multiplied each with the others, and the product of their respective modulations as a function of spatial coordinates $(\underline{x})$ and wavelength λ is:

$$\pi(\underline{x}, \lambda)=P_y(\underline{x})|\alpha_y \cdot P_m(\underline{x})|\alpha_m \cdot P_c(\underline{x})|\alpha_c \quad \text{(Relation 3)}$$

Where:

$\pi(x,\lambda)$ represents the product of the periodic yellow, magenta and cyan modulations as a function of spatial coordinates $(\underline{x})$ and wavelength (λ).

FIG. 2A shows a special case of Relation 3. At a first glance, it might not appear that multiplication of Relation 1 with Relation 3 would yield Relation 2. For example, the blue term in Relation 2 would appear to come out:

$$\pi(\underline{x}, \lambda)\cdot I_B(\underline{x})=I_B(\underline{x})\cdot P_y(\underline{x})|\alpha_y P_m(\underline{x})|\alpha_m P_c(\underline{x})|\alpha_c$$

When it is realized, however, that the magenta and cyan filters each transmit blue, and that the blue light does not "see" these filters, it is apparent that the terms involving $P_m$ and $P_c$, should not appear in practice. Ideally, the transmittance of blue through magenta and cyan filters is unity, in the sense that the magenta and cyan filters are not a function of the spatial coordinates $(\underline{x})$ for blue; thus, the terms $P_m$ and $P_c$ are constants with relation to $(\underline{x})$, and have a value of unity for an ideal dye, so that, for practical purposes we can set:

$$\pi(\underline{x}, \lambda)\cdot I_B(\underline{x})=I_B(\underline{x})\cdot P_y(\underline{x})|\alpha_y \quad \text{(Relation 4)}$$

That is, the blue light is modulated, essentially, only by the yellow filter. Similarly:

$$\pi(\underline{x}, \lambda)\cdot I_G(\underline{x})=I_G(\underline{x})\cdot P_m(\underline{x})|\alpha_m \quad \text{(Relation 5)}$$

$$\pi(\underline{x}, \lambda)\cdot I_R(\underline{x})=I_R(\underline{x})\cdot P_c(\underline{x})|\alpha_c \quad \text{(Relation 6)}$$

Hence multiplication of the scene (Relation 1) with the "negative" filter (Relation 3) yields Relation 2 in the form:

$$I_w(\underline{x}, \lambda)\cdot\pi(\underline{x}, \lambda=I_B(\underline{x})\cdot P_y(\underline{x})|\alpha_y + I_G(\underline{x})\cdot P_m(\underline{x})|\alpha_m + I_R(\underline{x})\cdot P_c(\underline{x})|\alpha_c \quad \text{(Relation 2B)}$$

The "negative" color filter consists of negative or subtractive color dyes on a background which may be transparent to white light.

Multiplicative filters according to FIG. 2A may be made by any convenient process which yields the desired color filter lines on a clear background. For example, a suitable filter has been made on three separate sheets of presensitized film on a polyester base, designated as sheets 45.1, 46.1 and 47.1 in FIG. 2A, which were then placed adjacent each other and supported as layers in a frame 10, as shown in FIG. 1, where the composite filter bears the reference character 11. A commercially available color transparency film, available from Minnestoa Mining and Manufacturing Company, under the name "3M Brand Color-Key Proofing System" was used to make each filter layer shown in FIG. 2A. Alternatively, an optically similar filter can be made of any suitable three-layer color film, such as "Ektachrome" or "Kodacolor" (Eastman Kodak Co.), "Anscocrome" (General Aniline and Film Co.), or "Agfacolor" (Agfa Aktiengesellschaft Leverkusen-Bayerwerk), as is described in the second of the above mentioned applications of Mueller.

Referring now to FIG. 1, a camera 20 is supported on a rail 21. The camera includes a back 22 holding a photostorage medium 23, such as a black and white photographic plate, having only one photostorage layer on it. A lens assembly 24 includes lens means 25 and iris stop means 26, which is adjustable in the usual fashion. The frame 10 is also supported on the rail 21, and is adjusted to locate the modulating filter 11 somewhere between the hyperfocal distance and half the hyperfocal distance at which the lens means 25 is focused, as is described in detail above. A bellows 27, similar to the camera bellows, is provided between the frame 10 and the lens assembly 24. An arrow 28 represents the scene being photographed, located a distance beyond the filter 11.

Light from the scene 28 is muliplied with each of the gratings 45, 46 and 47 to make three exposures simultaneously added in the photostorage on the plate 23. Each exposure shows the same scene, but with a unique modulation representing one of the gratings 45, 46 or 47, and each grating represents a unique color, or spectral band. The resulting final black-and-white storage of color-coded information is thus the sum of products according to Relation 2, and has a configuration substantially as is schematically-shown in FIG. 3, where the grating lines are represented crossing over the image of the scene 28, which in turn is represented by double-headed arrows 28.1 and 28.2. The image 29 stored on the plate 23 is desirably a transparency.

FIG. 4A illustrates diagrammatically an optical system for reconstructing and viewing or recording colored images that are stored in black-and-white as described above. This is a fairly conventional partially-coherent optical system comprising a light source 60, pin hole aperture 61, light collector lens 62, converging (or transform) lenses 63 and 65 separated by the sum of their focal lengths $f_1$ and $f_2$, frame means 66 for supporting the color-coded black-and-white transparency 29 and support means 67 for supporting a photosensitive color medium or a display screen. A color reconstruction filter 68, details of which are shown in FIG. 4B, is located in the back focal plane of the first transform lens 63 and the front focal plane of the second transform lens 65. For simplicity of illustration, only the grating modulation lines at three different angles are shown in the black-and-white stored image 29, but it will be understood that this image is a transparency containing original scene 28 information as well as grating information.

For purposes of the invention, the light source 60 should be an intense polychromatic light source; an arc lamp will be suitable.

The pin hole aperture 61 is used to increase the coherency of the light and the collector lens 62 following the aperture can provide a light beam of a selected diameter for illuminating the system. With a collimated light beam the distance between the collector lens and the following components of the system becomes noncritical. With an uncollimated light beam magnification can be obtained.

The color reconstruction filter 68 in the back focal plane of the first lens 63 is located in the Fourier transform plane. The light beam from the collecting lens 62 is brought to a point focus at the transform plane. The light from the source 60 must be at least partially coherent at the illumination plane where the stored image 29 supported in frame 66 is illuminated. The required degree of coherence is related to the carrier frequency. Preferably the coherence interval (the distance between two extreme points in a light field which still exhibit interference)

should be equal to or greater than a few periods lengths of the carrier frequency.

With the black-and-white color-coded stored image 29 positioned in frame 66, a diffraction pattern will appear in the transform plane. This diffraction pattern is shown at the location of the color reconstruction filter 68. Light from the source 60 that is undisturbed by the recorded image 29 will be focused to the center of the transform plane as spot illustrated as the central illumination spot 70. This spot represents the zero order of each grating and is commonly called the DC spot. Since this spot is independent of grating orientation it will be common to all of the individual color-band images superimposed in the stored image 29. A vertical series of spots 71 represents diffraction orders of the horizontal grating 45, related to the "blue" exposure. Extending out in both directions beyond the zero diffraction order are the first and several higher difffraction orders.

The diffraction orders 72 related for example to the "green" exposure (grating 46) are in a line azimuthally rotated 60° clockwise from the diffraction orders 71, and the diffraction orders 73 related for example to the "red" exposure (grating 47) are in a line rotated azimuthally 60° clockwise from the diffraction orders 72.

Reconstruction of the original color scene is obtained by placing a color reconstruction filter 68 as illustrated, for example, in FIG. 4B in the transform plane of FIG. 4A. The color reconstruction filter is, in this illustration, opaque at the center 69, to block the D.C. spot 70. Arrayed about the center in diametrically-opposed pairs are six equal sectors of color filter material. A pair of blue filter sectors (B, B) are located in the path of light forming the diffraction orders 71 related to the blue exposure, a pair of green filter sectors are located in the path of light forming the diffraction orders 72 related to the green exposure, and a pair of red filter sectors are located in the path of light formng the diffraction orders 73 related to the red exposure. A reconstruction, in full color, of the original scene 28 appears in the plane of the support means 67, where it can be recorded on color-sensitive photographic film, or observed on a screen. This reconstruction would contain grating-like images (fringes) since more than one diffraction order is passed on each sector. By passing only one diffraction order through each sector or by destroying temporal coherence between orders from each grating, continuous tone reconstructions may be obtained without the presence of fringes.

FIG. 5 shows the camera assembly 30 of FIG. 1, showing only the filter 11 and plate 23, with a support 35, for an object to be photographed, located beyond the filter. Pairs of blue lights 31, green lights 32, and red lights 33 are arranged alongside the optical path between the filter 11 and support 35, to illuminate the support with light of any one of these three colors. If now an object, such as a printed page (not shown) is placed on the support 35 and illuminated with the blue light, an image of this object modulated by the yellow grating 45 will be photographed on the plate 23, as is represented schematically in FIG. 6A. If a second object is then placed at the support 35 (the first object being removed) and illuminated with green light (lights 32 turned on, lights 31 and 33 off) an image of the second object modulated by the magenta grating 46 will be photographed on the plate 23, double-exposed with the first image. If, finally, a third object is placed (alone) at the support 35 and is illuminated with red light (lights 33 on; 31 and 32 off), an image of the third object modulated with the cyan grating 47 will be photographed on the plate 23, triple-exposed with the first two images. Each image will be multiplied with its unique grating, and all three images will be added in the plate 23. The configuration of the stored image will be similar to that shown in FIG. 3, except that, instead of an image of one scene resulting in one image 28.1 and 28.2, we now have images of three different scenes one on top of the others, as would be expected from a triple exposure to three different scenes. The representation of grating images shown in FIG. 3 is, however, the same. FIGS. 6A, 6B and 6C schematically show three different printed texts, each representing a different scene, as photographed through the respective gratings 45, 46 and 47. These are superposed on the plate 23 in a composite stored image 29.5 in FIG. 7 containing the triple exposure. The individual images can be separately read out in a system as shown in FIGS. 7 and 8.

FIG. 7 is identical to the system of FIG. 4A, except that the triple-exposure stored multi-image 29.5 is substituted for the black-and-white color coded image 29 of a single scene, and that a different spatial filter 88 is used in FIG. 7. The diffraction pattern which appears in the Fourier transform plane now comprises the zero order 80, in which all the images are present, and diffraction orders 81 of the image of the yellow grating 45, diffraction orders 82 of the image of the magenta grating 46, and diffraction orders 83 of the image of the cyan grating 47. Each diffraction order of each grating contains complete information of the scene which was taken through that grating. The spatial filter 88 is an opaque sheet in the transform plane, containing an aperture 85 of a size to pass the light from one only diffraction order of only one grating, so that one of the scenes appears at the support 67, where it may be viewed or photographed. This technique for separating multiple-stored images is described in greater detail and claimed in the first of the above-mentioned application of Mueller, Ser. No. 510,807.

It will be appreciated that the area of the filter 11 can be several times the area of the photostorage medium 23. FIG. 1 is not drawn to any particular scale. Thus, in a particular example, using a 35 mm. camera with a 50 mm. focal length lens, in which the image format is 24 x 36 mm., the filter 11 was approximately 10 inches in diameter. In the example given in the foregoing discussion of the hyperfocal distance, a 16 mm. movie camera having a 10 mm. focal length lens, was fitted with a filter 11 about 4″ x 6″ in size. From this latter example, it will be seen that if the line frequency of the grating in the plane of the plate 23 is to be 20 lines/mm., then the line frequency 4″ x 6″ filter can be approximately one-quarter of that frequency, or about 5 lines/mm.

While the invention has been described in relation to specific embodiments, various modifications thereof will be apparent to those skilled in the art and it is intended to cover the invention broadly within the spirit and scope of the appended claims.

I claim:

1. In a photorecording system employing image-wise exposure of a photostorage medium through light-focusing means to produce in said medium an image of a scene modulated with a spatial carrier frequency as a function of position in the photostorage medium, the improvement comprising means to support a photostorage medium, means to support light-focusing means for making image-wise exposure of said medium to light from a scene, means to focus said light-focusing means at a hyperfocal distance thereof, and means located in the region between said hyperfocal distance and half said hyperfocal distance for effecting a periodic spatial modulation at said frequency of light used to make the image-wise exposure, said hyperfocal distance being chosen to resolve said carrier frequency at said medium.

2. System according to claim 1 in which said spatial modulating means includes grating means for imposing on an incident light wave a periodic variation of intensity.

3. System according to claim 2 in which said grating means includes a plurality of gratings in planes substantially parallel to each other, each having a unique characteristic by which its diffraction orders can be spatially separated from the diffraction orders of the others by Fourier transform techniques.

4. System according to claim 3 in which each of said gratings incorporates spectral filter means for limiting light therefrom to a unique spectral frequency composition.

5. System according to claim 4 including support means for an object constituting said scene, and means to illuminate said support means with light limited to any one of a plurality spectral bands equal to said plurality of gratings, each spectral band having a spectral composition which can be modulated by only a unique one of said gratings.

6. System according to claim 2 including a camera having a lens and means to hold said medium behind said lens transverse to the optic axis thereof and in which said grating means is located in a plane transverse to the optic axis, the area of said grating means being several times the area of said image, whereby the periodic structure of said grating means can be coarse relative to the spatial carrier frequency modulation of said image.

7. System according to claim 3 in which said system includes a camera having a lens and means to hold said medium behind said lens transverse to the optic axis thereof, and said grating means is located in a plane transverse to the optic axis, the unique characteristic of each grating being an azimuthal characteristic in said plane.

8. System according to claim 7 in which each of said gratings is composed of lines having a unique direction in said plane.

9. System according to claim 8 in which each of said gratings is substantially transparent to white light between its lines, and the lines of each grating absorb a unique spectral frequency band and pass the remainder of the visible spectrum of light.

10. Sys.em according to claim 9 including support means for an object constituting said scene, said support means being located beyond said grating means and on said optic axis transverse thereto, and means to illuminate said support means with light limited to any one of a plurality of spec:ral bands equal to said plurality of gratings, each of said sources providing light which is absorbed by a unique one only of said gratings and which is passed substantially without attenuation by all the others of said gratings.

References Cited

UNITED STATES PATENTS

| | | | |
|---|---|---|---|
| 2,050,417 | 8/1936 | Bocca | 352—45 |
| 3,313,623 | 4/1967 | Bixby. | |

JOHN M. HORAN, Primary Examiner

U.S. Cl. X.R.

95—36; 352—45